United States Patent [19]

Santis et al.

[11] 3,742,409

[45] June 26, 1973

[54] MAGNETIC POSITION INDICATOR

[75] Inventors: Dean C. Santis, Pittsburgh; Andre Wavre, Monroeville; Andras I. Szabo, Export, all of Pa.

[73] Assignee: Westinghouse Electric Corporation, Pittsburgh, Pa.

[22] Filed: Nov. 27, 1970

[21] Appl. No.: 93,343

[52] U.S. Cl. .................... 336/45, 336/131, 336/132
[51] Int. Cl. ........................................... H01f 21/06
[58] Field of Search .................. 336/30, 40, 45, 90, 336/130, 131, 132, 133, 134

[56] References Cited
UNITED STATES PATENTS
2,941,170  6/1960  McCoy ............................. 336/30
2,395,881  3/1946  Klemperer ..................... 336/133 X Primary Examiner—Thomas J. Kozma
Attorney—A. T. Stratton and Z. L. Dermer

[57] ABSTRACT

A new type of position indicator is disclosed herein for detecting the presence or absence of magnetic material which operates on the principle of either saturating or not saturating a transformer. The indicator comprises a modified E core having two magnetic flux paths with a portion thereof common to both flux paths. An AC excitation winding is wound in transformer relationship with a secondary detection winding and generates the flux in one of the magnetic paths. The flux in the second magnetic path is generated by a DC excitation winding, which provides a means of saturation control over the E transformer. The DC magnetic circuit is opened or closed by the absence or presence of the magnetic material being detected; the detection winding in the AC circuit being responsive to the corresponding change in flux.

16 Claims, 6 Drawing Figures

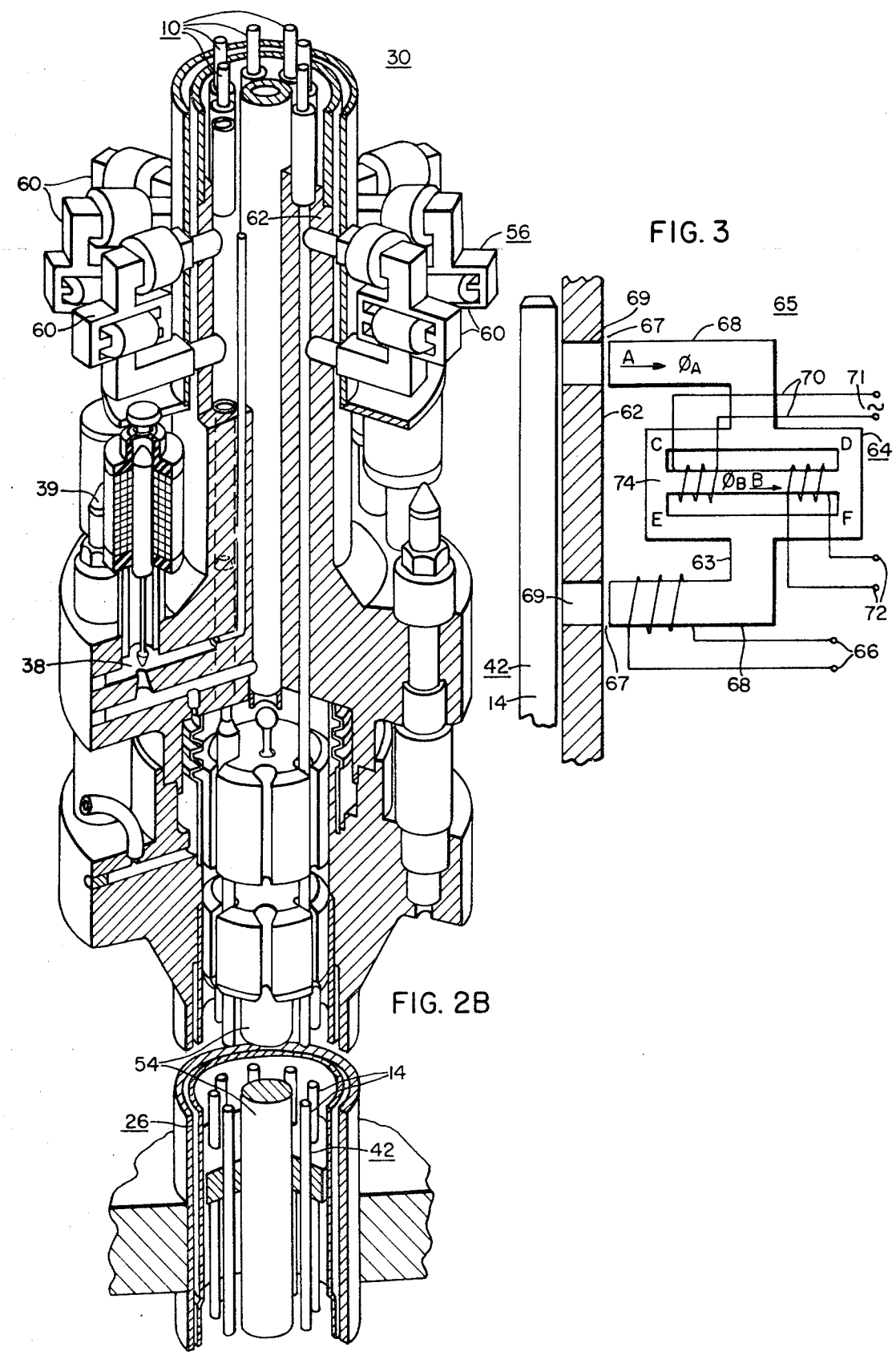

MAGNETIC POSITION INDICATOR

BACKGROUND OF THE INVENTION

This invention pertains in general to a new magnetic position indicator for detecting the presence or absence of magnetic material and is useful in detecting the presence or absence of control rods from the core of a nuclear reactor.

One type of control rod drive mechanism for nuclear reactors is an electrically controlled, hydraulically operated device which individually moves control rods between only two rest positions; either full in or full out. Each control rod consists of at least one neutron absorber element, approximately the same size as the fuel rods. Each control rod is connected to a hydraulic mechanism and travels in guide thimbles provided within the fuel assembly. In the inserted position, the absorber elements fit in the fuel assembly thimbles respectively and in the withdrawn position they move into guide tubes. This is the same arrangement used in current pressurized water reactor designs, except that in the aforedescribed system the rods cannot assume any intermediate positions other than being either fully inserted or fully withdrawn. Each hydraulic control rod mechanism is a completely independent system and controls the movement of one drive rod which is connected to the absorber rods associated with one control rod, in this example two interconnected absorber rods form one control rod. Eight of these independent mechanisms are located in a single control assembly, however, each mechanism must have its own valve coil and position indicator coils to operate completely independent of the other seven. For a better understanding of the operation of the aforedescribed control system reference may be had to application Ser. No. 700,153, now U.S. Pat. No. 3,519,535 filed Jan. 24, 1968 by Robert J. French et al., entitled "Nuclear Reactor" and assigned to the Westinghouse Electric Corporation.

Several types of indicators have been considered with respect to this control system for detecting the presence or absence of the control rods from the nuclear core. The first indicator considered was a transformer type rod position indicator. This indicator consisted of a transformer wound on a C-core with an auxiliary coil in series with a secondary winding. The poles of the C-core pass through the control rod housing and are welded to the housing. The magnetic circuit is opened or closed by the absence or presence of the magnetic drive rod which is used as part of the magnetic circuit. When the drive rod is present and the magnetic circuit is closed, the secondary voltage is large due to transformer action, and when the rod is missing, the secondary voltage is small because of the large reluctance of the magnetic circuit and because of the auxiliary coil which helps to null out the secondary voltage. This scheme has two basic disadvantages, due to the shorting effect of the non-magnetic metallic drive rod housing on the transformer, which leads to its unreliable and ineffective use. First, it must be excited by a low frequency sinusoidal signal, for example 10 Hz, which would require some sort of frequency converter as a source; and second, due to the shorting effect, the reliability of obtaining good output signal magnitudes is directly affected by the effective resistance of the shorted turn which, as is well known, is not temperature stable.

Another type of rod position indicator that was considered as a reed switch type rod position indicator. This indicator consists of a reed switch in series with a magnetic switch and a permanent magnet. The magnetic switch is actually the magnetic drive rod. When the drive rod is present, enough flux flows through the magnetic circuit to close the reed switch. When the rod is missing, the leakage flux that flows is not large enough to close the reed switch. The basic disadvantage of this type of rod position indicator is its reliability. First, the reed switch has a limited life which is an obvious disadvantage. Second, the reed switch rod position indicator is extremely sensitive to magnetic interference and expensive shielding would be necessary.

Thus a new rod position indicator was necessary to overcome the disadvantages of those already considered. The desired rod position indicator must have the following characteristics: It must be reliable; it must be temperature stable; it must be inexpensive; its use must not destroy the sealed integrity of the mechanism housing; it must give output signals which are large in magnitude in order to eliminate amplification and noise problems; it must have good discrimination between the output signals that indicate the presence or the absence of the drive rod; it must not require expensive magnetic shielding; it must not slow down the scram time of the control rod; it must require a minimum amount of installation wiring; and it must be efficient to use.

SUMMARY OF THE INVENTION

A new position indicator was devised to overcome the disadvantages of the prior art and to provide the aforementioned desired characteristics. This position indication system uses two bistable position indicators per drive rod or movable element to determine its position. The first indicator is located at one extremity of movement of the movable element, i.e., at the top of the mechanism, and is used to detect the presence of the drive rod in the upper portion of the drive rod housing. Similarly, the second indicator is located at the other extremity of movement, i.e., at the bottom of the mechanism, and is used to detect the presence of the drive rod in the lower portion of the housing. When the drive rod is in the full out position, both the top and bottom indicators will detect its presence. When the rod is in the full in position, neither indicator will detect it. If something fails and the drive rod remains stuck in the middle, the top indicator will not detect it while the bottom indicator will. A modified mechanism is also disclosed wherein the bottom indicator only detects the presence of a rod where the rod is neither full in nor full out.

The basic principle of the indicator is that of a saturable transformer. The indicator comprises a transformer wound on a modified E core. The poles of the E core pass through the control rod housing and are hermetically secured to it as by welding. The indicator has a detection winding and a DC and AC excitation winding. The AC excitation winding and the detection winding are wound similar to primary and secondary transformer windings. The DC winding provides a means of saturation control over the E transformer. The DC excitation coil is driven from a DC current source which sets up a DC flux whose magnitude is dependent on the reluctance of the magnetic circuit. The primary of the transformer, located on the center leg of the main core of the indicator, is driven by a sinusoidal current source, for example 60 Hz, and the secondary of the transformer is connected to a detection unit, such as an oscilloscope.

The position indicator contains two magnetic circuits labelled A and B for convenience. These two magnetic circuits utilize common magnetic paths which are not orthogonal to each other. If the magnetic circuit B is driven by a time varying magnetomotive force, the flux B, which will flow, is dependent on the reluctance of the magnetic circuit. By increasing the flux flowing in the magnetic circuit A, the reluctance of the common magnetic paths are increased; therefore, causing the flux B to decrease. This change in the flux B can be detected by observing the voltage drop across the secondary winding. The magnetic drive rod completes the magnetic circuit A. When the magnetic drive rod is missing, the reluctance of magnetic circuit A is increased and therefore the flux A associated therewith decreases. This in turn causes the reluctance of the common magnetic paths to decrease, therefore causing the flux B and the voltage drop across the secondary to increase. When the drive rod is present, the reluctance of magnetic circuit A is decreased and therefore the flux A increases. This in turn causes the reluctance of the common magnetic path to increase, therefore causing the flux B and the voltage drop across the secondary to decrease. It should be noted that this device utilizes the fact that magnetic material has a non-linear B-H relationship.

A new DC MMF biasing scheme is also provided herein. The new design was necessary to overcome an inherent condition in the hydraulic control mechanism which makes it almost impossible to detect the presence of the control rod drive shafts by the bottom indicators. The new biasing scheme comprises two primary coils which are wound around the outer circumference of the control rod housing. These coils are redundant and supply the necessary DC MMF required to operate all of the indicators at the bottom, eight indicators in this example. There is also a permanent magnet embedded in one pole of each indicator. The magnets are used to nullify the DC leakage flux which flows then the rod is missing. The philosophy behind the use of the permanent magnets to nullify the DC leakage flux is that it is easier to detect a change of 0 to 1 than a change of 100 to 101. This scheme in conjunction with the use of a non-magnetic section in the drive shaft, which is opposite the bottom indicator when the rod is in the full up condition, provides a workable solution to the aforementioned rod detection problems.

DESCRIPTION OF THE DRAWINGS

For a better understanding of an exemplary embodiment of this invention, reference may be had to the accompanying drawings, in which:

FIGS. 2A and 2B when taken end-to-end represent an isometric view of the control assembly of FIG. 1 with a portion thereof cut away for clarity, FIG. 2A showing the top portion of the assembly containing the top position indicator and FIG. 2B showing the portion of the assembly containing the lower position indicator;

FIG. 3 is a schematic diagram of a rod position indicator, illustrative of one embodiment of this invention;

DESCRIPTION OF THE PREFERRED EMBODIMENT

Figure 1:
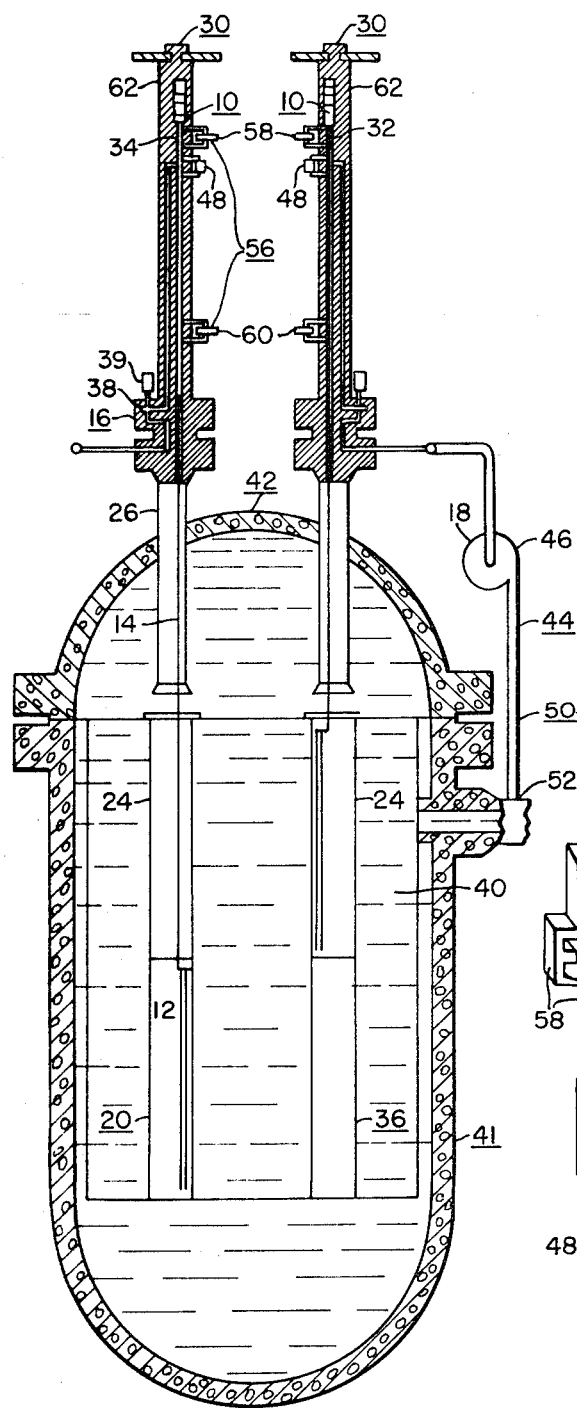
FIG. 1 is a schematic diagram of a nuclear reactor and its control rod drive system embodying the novel position indicator of this invention.

This invention is illustrated for use with an electrically controlled, hydraulically operated, reactivity control system for the pressurized water reactors. As illustrated in FIG. 1, each control rod 42 consists of a pair of neutron absorber elements 12, each of which is approximately the same size as the fuel rods not shown. This may be contrasted with the control rods used in the present RCC (Rod Cluster Control) drives which contain either 16 or 20 of these absorber elements. For a more detailed understanding of the Rod Cluster Control system reference may be had to application Ser. No. 721,122 filed Apr. 12, 1968 by Robert J. Creagan et al., entitled "Fuel Assembly For Nuclear Reactors," and assigned to the Westinghouse Electric Corporation. The pair of absorber elements 12 of each rod 42 is connected to a hydraulic mechanism 16 and travels in guide thimbles, not shown, provided within the fuel assembly 20. In a typical design, about 400 control rods are provided in a 193 fuel assembly core. A simplified drawing of the system is shown in FIG. 1, which illustrates two identical assemblies 30 each showing a schematic view of one mechanism 10. The system includes the absorber rods 12, the drive rods 14, the actuating mechanism 16, the pump 18 and the control system not shown.

In the inserted position, the absorber rods 12 fit in the fuel assembly thimbles, not shown, and in the withdrawn position they move into the guide tubes 24. This is the same arrangement used in the current pressurized water reactor designs, except that in the system of FIG. 1 the rods cannot assume intermediate positions; being either fully inserted or fully withdrawn. The drive rods 14, each of which moves two absorber rods 12, are laterally supported above the guide tubes 24 and in the vessel head adapter 26, to provide added stability.

Each hydraulic control rod mechanism 10 is a completely independent system and controls the movement of one drive rod 14 which is connected to two absorber rods 12. In this example, eight of these independent mechanisms are located in a single control assembly 30. Each drive rod 14 is rigidly attached to a piston 32, which fits loosely in a cylinder 34, above the core 36. The rod is lifted by momentarily opening the valve 38, which allows liquid coolant 40, in the reactor vessel 41, to flow up the cylinder 34, lifting the piston 32, and thus the control rod 42. The coolant then flows into a recirculation system 44, maintained at a fixed increment below the reactor cooling system pressure by a centrifugal pump 18. The pressure differential supplies the force for lifting only one piston 32 in a control rod at a time. Flow through each mechanism 10 is controlled by a simple, solenoid-operated, normally closed valve 38, which discharges into a manifold 46, connected to the suction side of the pump 18 as shown in FIG. 1. Upon withdrawal the piston 32 is held in its upper position by an electromagnet 48 and the valve 38 is closed. When the electromagnet 48 is deenergized, the control rod 42 falls back into the core 36 by gravity.

Figure 2A:
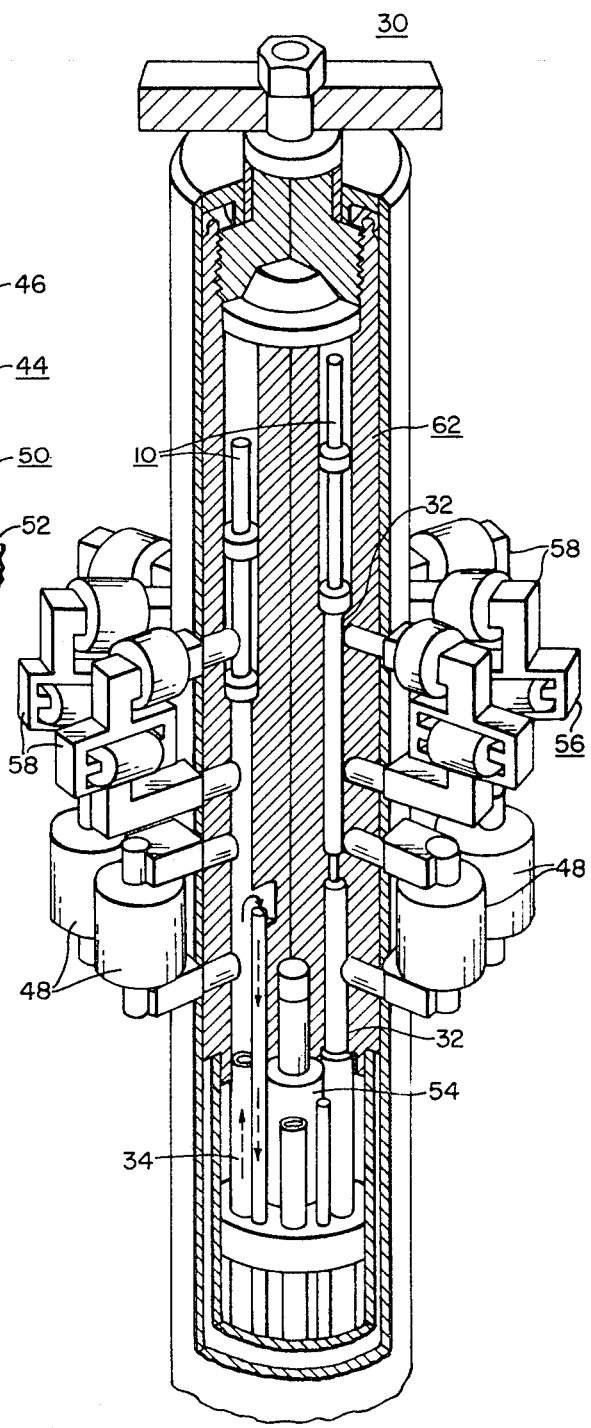

In this example eight mechanisms are grouped together in a control assembly and have a common fluid outlet. However, each mechanism 10 has its own valve 38, hold coil 48 and position indicator coils 56 and thus operates completely independently of the other seven. The flow from each control assembly is collected in a piping network 50 and returned to a connection on the reactor coolant piping 52. A single control assembly 30, containing the eight individual control mechanisms 10, may be observed in FIGS. 2A and 2B. FIG. 2A illustrates the top portion of the control assembly containing the top position indicator and FIG. 2B illustrates the lower portion of the control assembly containing the lower position indicator. Each of the eight mechanisms 10, are symmetrically arranged around the drive rod support column 54.

A new rod position indication system 56, referred to at times herein as the saturable transformer rod position indication system, using magnetic circuits, has been developed for detecting the position of the control rods 42, in the new control rod drive system of FIG. 1. The development was necessary due to the fact that prior indicators were unreliable and inefficient to use. As mentioned above, in the FIG. 1 system, the individual rods 42, have only two rest positions; either fully inserted or fully withdrawn. Unless a malfunction occurs, the individual rods 42, will never be in the middle.

This rod position indication system 56, uses two bistable rod position indicators 58 and 60 per control rod 42, to determine its position. The first indicator 58, is located at the top of the mechanism 10, and is used to detect the presence of the movable element or control rod 42, in the upper portion of the housing 62. Similarly, the second indicator 60, is located at the bottom of the mechanism 10, and is used to detect the presence of the control rod 42 in the lower portion of the housing 62. In one embodiment of this invention, when the control rod 42, is in the full out position, both the top indicator 58, and the bottom indicator 60, will detect its presence. When the rod 42, is in the full inserted position in the reactor core, neither will detect it. If failure occurs and the control rod 42, remains stuck in the middle, the top indicator 58, will not detect it while the bottom indicator 60 will. Such an indication system must have the following characteristics: it must be reliable; it must be temperature stable; it must be inexpensive and must not destroy the sealed integrity of the mechanism housing; it must give output signals which are large in magnitude in order to eliminate amplification and noise problems; it must have good discrimination between the output signals that indicate the presence or the absence of the drive rod; it must not require expensive magnetic shielding; it must not slow down the scram time of the rod nor must it be capable of holding the rod; it must require a minimum amount of installation wiring and it must be efficient to use.

An indication system which satisfies the aforementioned criteria is illustrated in FIG. 3. The magnetic core 65 of the indicator is generally C-shaped having two open legs 68 and a bight 63 connected therebetween. At least a portion of the bight forms a generally theta shaped main core 64. The DC excitation coil 66, is driven from a DC current source, not shown, which sets up a DC flux $\phi_A$ whose magnitude is dependent on the reluctance of the magnetic circuit. The primary winding 70, of the transformer, located on the center leg 74, of the main core of the indicator, is driven from a sinusoidal current source 71 for example a 60 Hz source. The secondary transformer winding 72, is connected to a detection readout such as an oscilloscope, not shown.

The basic principle of operation is that of a saturable transformer. The indicator includes a detection winding 72, and a DC and AC excitation winding 66 and 70. The AC excitation winding 70 and the detection winding 72, are wound similar to primary and secondary transformer windings. The DC winding 66, provides a means of saturation control over the E-core transformer. In this embodiment the magnetic circuits A and B utilize, in part, common magnetic paths within the main core 64, which are not orthogonal to each other. The common magnetic paths or regions are illustrated in FIG. 3 by the reference characters C, D, E and F, respectively. The magnetic circuit B is driven by a time varying magnetomotive force imparted by winding 70. The flux $\phi_B$ which will flow in magnetic circuit B is dependent on the reluctance of the magnetic circuit. By increasing the flux flowing the magnetic circuit A the reluctance of the common magnetic paths C, D, E and F are increased, therefore causing the flux $\phi_B$ to decrease. This change in flux $\phi_B$ can be detected by observing the voltage drop across the secondary coil 72, in magnetic circuit B. When the rod 42, is missing, the reluctance of the magnetic circuit A is increased and therefore $\phi_A$ decreases. This in turn causes the reluctance of the magnetic path C, D, E and F to decrease; therefore, causing $\phi_B$ and the voltage drop across the secondary coil 72, to increase. When the rod 42, is present, the reluctance of the magnetic circuit A is decreased and therefore $\phi_A$ increases. This in turn causes the reluctance of the magnetic paths C, D, E and F to increase; therefore, causing $\phi_B$ and the voltage drop across the secondary coil 72, to decrease.

Figure 4:
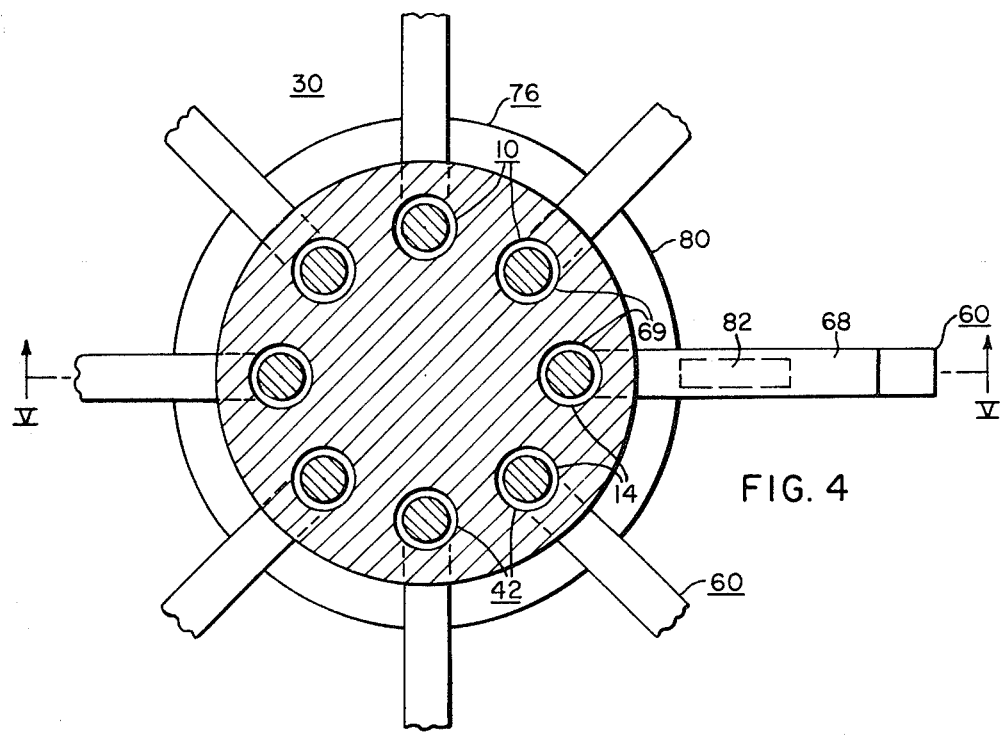
FIG. 4 is a schematic diagram showing a cross-sectional view of a control assembly incorporating a modified DC biasing scheme for saturating the saturable transformer indicator of FIG. 2.
Figure 5:
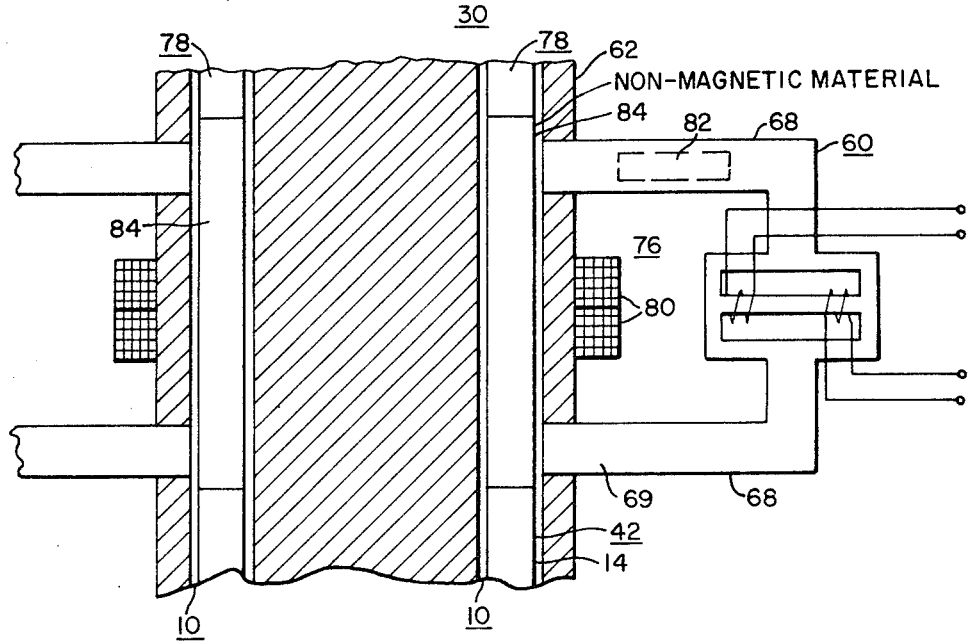
FIG. 5 is a schematic diagram showing a longitudinal sectional view of the control assembly of FIG. 4 taken along the lines V—V thereof, illustrating some novel modifications made to the circuit of FIG. 3.

Referring now to FIGS. 4 and 5 it may be seen that a new arrangement, identified generally by the reference character 76 is described herein to supply the DC MMF necessary to bias the saturable transformer indicator or the reed type of indicator used by the prior art. FIGS. 4 and 5 are schematic representations of a control assembly 30, showing each of the eight mechanisms 10, associated with each assembly 30 and the lower indicators 60, associated with each mechanism 10. The instant arrangement for DC biasing is necessary to overcome an inherent condition in the control mechanism which make it almost impossible to detect the presence of the control rod drive shafts 14, by the bottom indicators 60. One of the reasons why reliable detection was not possible is that the change in DC flux from when the rod 14 is present, to when it is absent, is not large enough. The reason for this is that when the drive shaft 14 is present at the bottom indicator 60, in the worst case, an air gap appeared between the shaft 14 and the magnetic plugs 69, which is comparable to the air gaps between the adjacent shafts 14, and the plugs 69. Another reason is that the DC leakage flux which flows through the indicator when the rod 14 is missing is comparable to the flux which flowed when the rod 14 is present. The following changes were made in the control mechanism 10 to correct some of these difficulties: (1) The air gap 67 (shown in FIG. 3) between the magnetic plugs 69 and the poles 68 has been reduced; (2) the worst case air gap between the magnetic plugs 69 and the control rod drive shaft 14, has been reduced; and (3) a sandwich type of control rod drive shaft 78, is used. The modified drive shaft 78 is so constructed that when the rods 42 are in their full out position a non-magnetic portion such as the insert 84 will appear in front of the indicators 60, at the bottom. If one adjacent rod 42 is struck, the indicators 60 on each side will not detect its presence. If the two rods 42 adjacent to a given indicator 60 are struck, the latter indicator 60 can read erroneously, since such a condition in a control assembly will call for immediate attention.

In accordance with the present invention, means are also provided for supplying the DC MMF, as illustrated in FIGS. 4 and 5. Two coils 80 are wound around the outer circumference of the housing 62 and serve as the primary redundant coils which supply the required DC MMF to operate all eight of the bottom indicators 60. There are also permanent magnet inserts 82 embedded in one pole 68 of each indicator 60. These permanent magnets 82 are used to nullify the DC leakage flux which flows when the rod 42 is missing. The philosophy behind the use of the permanent magnets 82 for nullifying the DC leakage flux is that it is easier to detect a change of 0 to 1 than a change of 100 to 101. This scheme in conjunction with the use of a non-magnetic insert 84 in the drive shaft 14, which is positioned opposite the bottom indicator 60 when the rod 42 is in the full up condition, provides a workable solution to the problem of rod detection. The permanent magnets 82 are not necessary in the top indicators 58 (shown in FIGS. 1 and 2) for satisfactory operation, even when two adjacent drive shafts 14 are present. This is due to the difference in cross section of the control mechanism of the two points as may be observed in FIGS. 2A and 2B. Though it should be understood that the new indicator design may be used for both the top and bottom indicators with considerable advantage. Thus, the indication system 56 of this invention has three important advantages over previous designs. First and most important it provides an acceptable solution to the problem of rod detection. Second through the use of redundancy, the loss of one excitation coil 80 does not affect the operation of the indicators 60, whereas the loss of a coil in the indicators of the prior art would mean the loss of at least one indicator. Third the use of the new scheme has an economic advantage over the old scheme, inasmuch as separate DC biasing coils are not needed for each indicator. In the illustrated embodiment two DC coils are used to bias eight indicators thus cutting the total number of wires needed from 64 to 40 per assembly.

There are many modifications that may be made to the aforementioned circuitry to maintain specific design criteria, without departing from the scope of this invention. Such modifications may be used to overcome problems involving: Magnetic interference; a reduction in holding forces on the control rods; increased magnitude of the output voltage; improved output voltage ratios; and temperature stabilization. The resultant design changes will depend upon the environment in which the invention is used.

Two modifications are available for minimizing the affects of magnetic interference on the saturable transformer rod position indicator. The first is to make the flux $\phi_A$ large in magnitude compared to the leakage fluxes which may be coupled in. This can be done by increasing the cross-section area of the main core 64 (illustrated in FIG. 3) which in turn allows the flux $\phi_A$ to be increased. Care must be taken so that the pole pieces 68 do not saturate before the main core 64 saturates in regions C, D, E and F. The second is to add some magnetic material so as to divert the leakage fluxes away from the main core 64 of the indicator. This arrangement is utilized in the preferred embodiment illustrated above in FIGS. 4 and 5.

There are four ways to reduce the holding forces of the indicator on the drive rod 14. These four modifications relate to methods of decreasing the flux $\phi_A$ which flows through the pole pieces 68. The first consists of decreasing the cross-section area of the main core 64 in the regions C, D, E and F, which results in the need of less flux to control the reluctance of these regions. The second and third respectively comprise decreasing the DC excitation current and decreasing the number of turns of the DC excitation coil 66. In order to maintain a reasonable output signal, when these methods are used, it may be necessary to decrease the cross-section area of the main core 64 as described above. The fourth method consists of increasing the reluctance of the pole pieces 68 which is achieved by adding air gaps between the pole piece and the magnetic plugs as shown in FIG. 3 by reference character 67.

There are two alternatives which may be employed to increase the magnitude of the output voltages. The first consists of adding more iron to the main core 64 which in turn will increase the change in flux. The second consists of increasing the number of turns and turns ratio of the transformer.

There are two methods for improving the output voltage ratios. The first consists of selecting the DC excitation current which gives a maximum ratio. The second consists of reducing the leakage flux coupling between the primary and secondary coils when the main core 64 is saturated. This can be done by leaving the primary coil 70 on the center leg 74 of the main core 64 and splitting the secondary coil 72 up among the regions C, D, E and F of the main core.

In addition there are two alternatives which may be employed to stabilize the indicator with temperature change. The first is to select magnetic material for use in the indicator whose magnitude characteristics are stable with temperature, such as 410 stainless steel. The second has already been illustrated in the aforementioned preferred embodiment. It involves using current sources for excitation; thereby eliminating the effects due to the resistance changes of the coils with temperature.

It is to be understood that these modifications are merely illustrative of some other embodiments of this invention and are not meant to be limitative thereof.

We claim as our invention:

1. A magnetic position indication system for detecting the presence or absence of a movable magnetic member having at least one magnetic position indicator comprising a magnetic core, said magnetic core having a first and a second magnetic loop and a magnetic flux path common to at least a portion of said first and second magnetic loops, the first of said magnetic loops forming a closed magnetic flux path and having AC flux excitation means coupled thereto, the second of said magnetic loops forming a normally opened circuited magnetic flux path and having DC flux excitation means coupled thereto, a movable magnetic member being movable to close the circuit of said second magnetic loop, whereby the presence of said movable member substantially between the open circuit of said second magnetic loop closes the DC magnetic flux path associated therewith to enable the DC flux flowing therein to saturate the magnetic core and thereby increase the reluctance of said common path, detection means in said first magnetic loop responsive to a change in the AC flux flowing therein due to the increased reluctance of said common magnetic path.

2. The magnetic position indicator of claim 1 wherein said detection means is placed in transformer relationship with said AC flux excitation means.

3. The magnetic position indicator of claim 1 wherein said AC flux excitation means comprises an AC coil magnetically coupled to said first magnetic loop.

4. The magnetic position indicator of claim 1 wherein said magnetic core comprises a generally C-shaped core having two open legs and a bight connected therebetween, said open legs being mounted on said housing and at least a portion of said bight being generally theta shaped.

5. The magnetic position indicator of claim 1 including at least one permanent magnet coupled to at least one loop of said magnetic core.

6. The magnetic position indication system of claim 1 including a plurality of said magnetic position indicators, and at least a portion of said magnetic position indicators having a common DC flux excitation means comprising at least one winding at least partially enclosing the magnetic cores of each position indicator of said portion of position indicators.

7. The magnetic position indicator of claim 1 wherein said movable member is so constructed that in at least one of its positions relatively non-magnetic material substantially bridges the open circuit of said second magnetic loop and in its remaining positions magnetic material substantially bridges the open circuit of said second magnetic loop.

8. The magnetic position indicator of claim 1 wherein said movable member comprises a portion of nuclear reactor control rod drive shaft.

9. The magnetic position indication system of claim 8 wherein said magnetic position indicator is mounted on a nuclear reactor control rod housing having said control rod drive shaft slidably mounted therein.

10. The magnetic position indication system of claim 9 including two magnetic position indicators longitudinally spaced along said housing for determining the presence or absence of said control rod shaft at said indicator location.

11. The magnetic position indication system of claim 10 wherein said control rod shaft is longitudinally movable to an upper and a lower rest position and said magnetic position indicators are substantially located at the upper extremity of said upper rest position and slightly above the upper extremity of said lower rest position respectively.

12. The magnetic position indication system of claim 9 wherein a plurality of said control rod shafts are circumferentially positioned around the inner wall of said housing and a plurality of said magnetic position indicators are circumferentially positioned around said housing adjacent said control rod shafts respectively.

13. The magnetic position indication system of claim 12 wherein each of said control rod shafts has a first and a second indicator respectively, said control rod shafts being longitudinally movable to an upper and a lower rest position and said first and second indicators are substantially positioned at the upper extremity of said upper rest position and slightly above the upper extremity of said lower rest position respectively.

14. The magnetic position indication system of claim 13 wherein said second indicators have a common DC flux excitation means coupled thereto, said DC excitation means comprising at least one winding partially enclosing the magnetic cores of each of said second indicators.

15. The magnetic position indication system of claim 9 wherein said magnetic core comprises a generally C-shaped core having two open legs and a bight connected therebetween, said open legs being mounted on said housing and at least a portion of said bight being generally theta shaped.

16. A magnetic position indication system for detecting the presence or absence of magnetic material having a plurality of magnetic position indication means, at least a portion of said magnetic position indication means having a DC flux path and a DC flux excitation means associated therewith, said DC flux excitation means being common to at least two of said indication means, comprising at least one winding at least partially enclosing the DC flux paths of said two indication means.

* * * * *